US 6,654,191 B2

(12) United States Patent
Ottesen et al.

(10) Patent No.: US 6,654,191 B2
(45) Date of Patent: Nov. 25, 2003

(54) RESTORATION OF HARD DISK DRIVE READBACK SIGNAL IN THE PRESENCE OF THERMAL MODULATION

(75) Inventors: Hal Hjalmar Ottesen, Rochester, MN (US); Gordon James Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 09/904,429

(22) Filed: Jul. 12, 2001

(65) Prior Publication Data

US 2003/0011916 A1 Jan. 16, 2003

(51) Int. Cl.[7] .............................. G11B 5/00; G11B 5/09
(52) U.S. Cl. .............................. 360/32; 360/25; 360/31
(58) Field of Search .............................. 360/31, 46, 67, 360/75, 77.08, 77.03, 32

(56) References Cited

U.S. PATENT DOCUMENTS

| | | | |
|---|---|---|---|
| 4,914,398 A | * 4/1990 | Jove et al. | ................... 361/111 |
| 5,455,730 A | 10/1995 | Dovek et al. | |
| 5,739,972 A | * 4/1998 | Smith et al. | ............. 360/77.03 |
| 5,751,510 A | * 5/1998 | Smith et al. | ................... 360/67 |
| 5,834,969 A | 11/1998 | Umeyama et al. | |
| 5,852,521 A | 12/1998 | Umeyama et al. | |
| 6,038,091 A | 3/2000 | Reed et al. | |
| 6,094,316 A | 7/2000 | Pham et al. | |
| 6,104,557 A | 8/2000 | Kasai et al. | |
| 6,130,793 A | 10/2000 | Ohmori et al. | |
| 6,151,177 A | 11/2000 | Shrinkle et al. | |
| 6,392,841 B1 | * 5/2002 | Ottesen et al. | .............. 360/137 |

| | | | |
|---|---|---|---|
| 2002/0191313 A1 | * 12/2002 | Ottesen et al. | ................. 360/31 |
| 2002/0191314 A1 | * 12/2002 | Ottesen et al. | ................. 360/31 |

FOREIGN PATENT DOCUMENTS

| | | |
|---|---|---|
| JP | 407287802 A | 10/1995 |
| WO | 00/63889 | 10/2000 |

OTHER PUBLICATIONS

"Amplitude Probability Density Function Generator", Oct. 1, 1982, IBM Technical Disclosure Bulletin, vol. 25, Issue No. 5, Pages 2514–2516.*
IBM Technical Disclosure Bulletin, vol. 33, No. 10B, Mar. 1991, "Prefiltering in the Design of Peristaltic Envelope Detectors", pp. 48–52.
IEEE Transactions on Magnetics, vol. 27, No. 6, Nov. 1991, "Magnetic Recording Channel Front–Ends", pp. 4503–4508.
IEEE Transactions on Magnetics, Vol 33, No. 5, Sep. 1997, "Electronic Abatement of Thermal Interference in (G)MR Head Output Signals", pp. 2611–2616.

* cited by examiner

*Primary Examiner*—David Hudspeth
*Assistant Examiner*—Natalia Figueroa
(74) *Attorney, Agent, or Firm*—Dugan & Dugan

(57) ABSTRACT

A magnetoresistive (MR) head of a hard disk drive provides a readback signal from a data storage disk. The readback signal is high pass filtered, amplified, sampled and digitized to obtain a digital readback signal. A thermal component of the digital readback signal is removed from the digital readback signal by an efficient nonlinear process in which an envelope of the digital readback signal is estimated to obtain upper and lower envelope sequences. The upper and lower envelope sequences are averaged to derive the estimated thermal component to be subtracted from the digital readback signal.

17 Claims, 7 Drawing Sheets

RESTORATION OF HARD DISK DRIVE READBACK SIGNAL IN THE PRESENCE OF THERMAL MODULATION

FIELD OF THE INVENTION

The present invention is concerned with hard disk drives, and is more particularly concerned with processing a readback signal provided by a hard disk drive.

BACKGROUND OF THE INVENTION

Hard disk drives are well known components of computer systems. A typical hard disk drive includes one or more data storage disks for storing data in magnetic form and a transducer used to write and read magnetic data respectively to and from the data storage disk. The data storage disk is mounted on a hub of a spindle motor which rotates the disk at speeds typically on the order of several thousand revolutions-per-minute. Digital frequency modulation information is stored in the form of magnetic transitions on a series of concentric, spaced tracks comprising the surface of the magnetizable rigid data storage disk. An actuator assembly adjustably positions the transducer above the data storage disk as the disk rotates. It is known to use an MR (magnetoresistive) element as a read transducer. The MR read transducer typically uses a constant bias current passing through the MR element. The magnetic information stored on the disk will modulate the MR resistance and thus changes the readback signal voltage.

A problem encountered with MR read transducers in hard disk drives is thermal modulation of the readback signal voltage produced by the MR read transducer. The thermal modulation of the readback signal voltage may interfere with recovery of data from the readback signal.

Thermal modulation may come about in a number of ways. For example, the MR head of an MR read transducer may come into contact with a burr or protrusion on the data storage disk. Such contact causes rapid frictional heating of the MR head. Because of the positive thermal coefficient of resistance of the MR head, the resistance of the MR head is rapidly increased. With the constant bias current applied to the MR head, the increase in resistance leads to a large positive excursion in the readback signal voltage. An event of this type is referred to as a "thermal asperity".

FIG. 1(a) is a graphical representation of a hard disk drive readback signal modulated at location 10 by a thermal asperity. FIG. 1(b) is a graphical illustration of the thermal component of the readback signal.

The readback signal from the MR head can also be thermally modulated by non-contact heating or cooling from the data storage disk. The thermal modulation is caused by variations in heat transfer from the MR head to the disk. Because of the constant bias current supplied to the MR head, it is heated above ambient temperature and tends to be cooled by the proximity of the data storage disk. When the MR head travels over a pit in the data storage disk, the greater distance separating the MR head from the data storage disk results in a decrease in the cooling effect of the data storage disk upon the MR head, so that the temperature of the MR head increases, leading to increasing thermal modulation of the readback signal produced by the MR head. Also, when the MR head travels over a bump on the data storage disk (without contact between the MR head and the data storage disk) the closer proximity of the MR head to the surface of the data storage disk at the locus of the bump leads to increased cooling of the MR head by the data storage disk. This lowers the temperature of the MR head, due to greater heat transfer leading to a decreased thermal modulation of the readback signal produced by the MR head. These types of thermal modulation of the readback signal are sometimes referred to as "baseline signal wander".

U.S. Pat. No. 5,751,510, which has the same inventors and the same assignee as the present invention, discloses a circuit that is adapted to remove a thermal modulation component from the readback signal produced by an MR head of a hard disk drive. The '510 patent is incorporated herein by reference in its entirety. According to the circuit shown in FIG. 9 of the '510 patent, the readback signal from the MR head is sampled and digitized and then a digital filter having a lowpass characteristic extracts the thermal component from the digitized readback signal. The thermal component is then subtracted from the readback signal (after the readback signal has been delayed to compensate for the delay in the filter) to produce a restored magnetic readback signal that is substantially free of thermal modulation.

While the '510 patent represents an advance in the art, the present inventors have found that it would be desirable to remove thermal modulation from a hard disk drive readback signal provided by a MR head in a manner that copes more satisfactorily with the nonlinear characteristics of the readback signal as it reflects actual data stored on the data storage disk.

SUMMARY OF THE INVENTION

According to an aspect of the invention, a method for processing a signal obtained from a storage medium using a magnetoresistive (MR) element is provided. The MR signal may be either a voltage or a current signal. The method includes reading the signal from the storage medium using the MR element and sampling and digitizing the signal to obtain a digital readback signal. The method further includes estimating an envelope of the digital readback signal by applying a nonlinear digital process to the digital readback signal to obtain an upper envelope sequence and a lower envelope sequence. The method further includes deriving an estimated thermal component of the digital readback signal from the upper envelope sequence and the lower envelope sequence, and subtracting the estimated thermal component from the digital readback signal to generate a restored digital readback signal.

The estimation of the thermal component of the digital readback signal may include examining the digital readback signal within each of a sequence of timing windows. Further, the method may include, for each of the timing windows, finding a second highest value of the digital readback signal in the respective window to indicate the upper envelope sequence, and finding the second lowest value of the digital readback signal in the respective window to indicate the lower envelope sequence. The step of deriving the estimated thermal component of the digital readback signal may include obtaining an arithmetic mean of the upper and lower envelope sequences.

Computer program products may be provided in accordance with these and other aspects of the invention. Each inventive program product may be carried by a medium readable by a computer (e.g., a carrier wave signal, a floppy disk, a hard drive, a random access memory, etc.).

With the present invention, removal of a thermal modulation component from the readback signal produced by an MR head from a hard disk drive is performed satisfactorily, notwithstanding changes in frequency that are characteristic of the frequency modulated data stored in actual practical use of the hard disk drive.

Other objects, features and advantages of the present invention will become more fully apparent from the following detailed description of the preferred embodiments, the appended claims and the accompanying drawings.

DETAILED DESCRIPTION OF PREFERRED EMBODIMENTS

Figure 2:
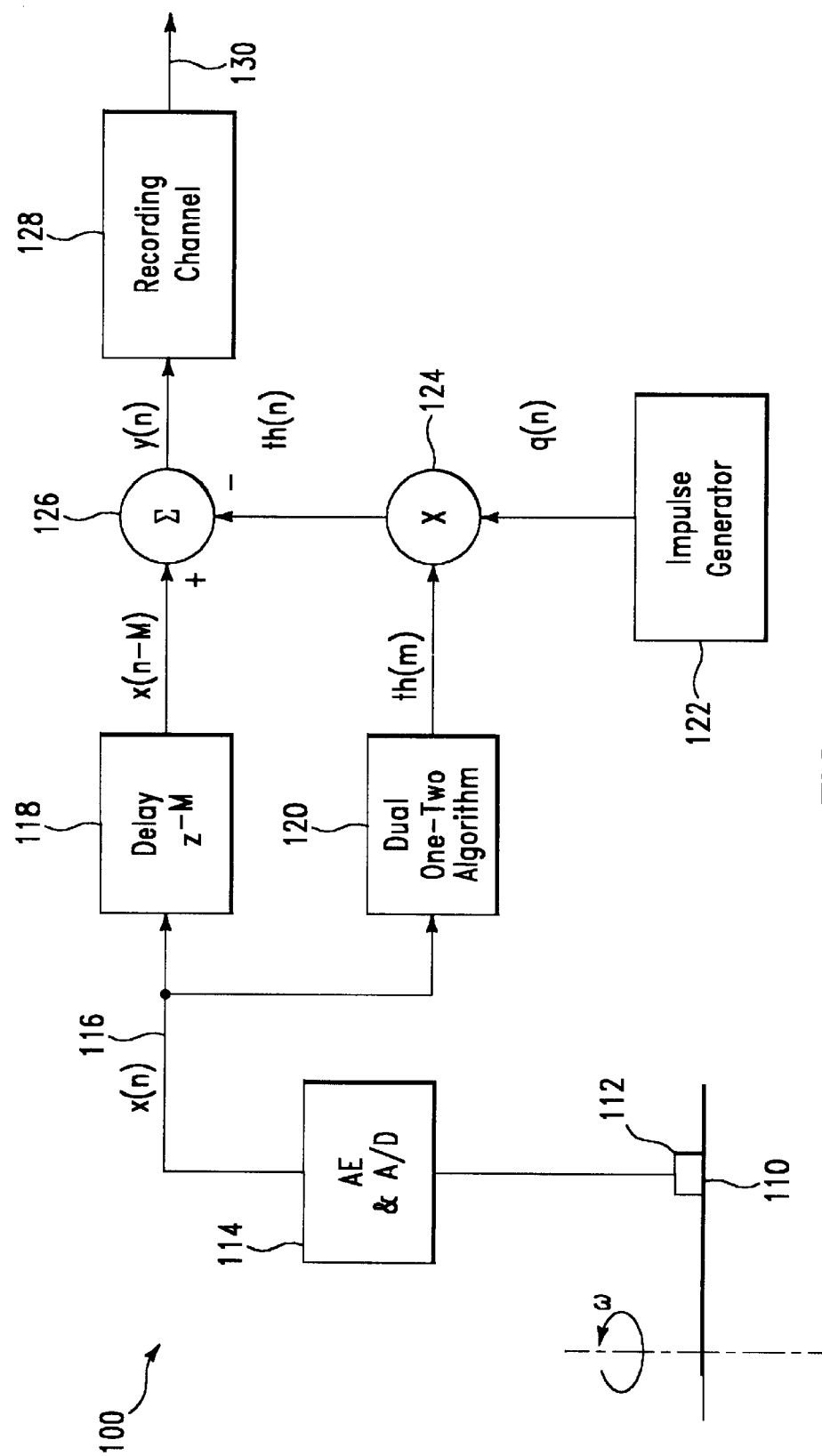
FIG. 2 is a schematic block diagram representation of a hard disk drive provided in accordance with the present invention.

FIG. 2 is a schematic block diagram representation of a hard disk drive provided in accordance with an embodiment of the present invention. In FIG. 2, reference numeral 100 generally indicates the hard disk drive. The hard disk drive 100 includes a data storage disk 110 which is mounted for rotation by a spindle motor which is not shown. A transducer including an MR head 112 is adjustably positioned above the rotating data storage disk 110. The MR head 112 produces a readback signal which is high-pass filtered, amplified, sampled and digitized by arm-electronics (AE) and analog-to-digital (A/D) block 114 to obtain a digital readback signal x(n) outputted on line 116. The digital readback signal x(n) on line 116 is provided in parallel to a delay block 118 and to a block 120. The block 120 employs a dual one-two-algorithm (to be described below) to perform an envelope estimation process on the digital readback signal x(n). The block 120 estimates the envelope of the digital readback signal by obtaining an upper envelope sequence and a lower envelope sequence. The block 120 further derives an estimated thermal component th(m) of the digital readback signal x(n) from the upper envelope sequence and the lower envelope sequence. Normally, the thermal component th(m) is of much lower frequency than the readback signal x(n).

An impulse generator 122 generates a unit impulse train q(n) which is synchronized with the digital readback signal x(n) (e.g., a unit impulse train having a frequency that is the same as the rate at which the readback signal is sampled). The unit impulse train q(n) generated by the impulse generator 122 is modulated at multiplication block 124 by the thermal component sequence th(m) outputted from block 120. The resulting sequence th(n) has the same higher sampling rate as, and is synchronized with, the digital readback signal x(n). The higher sampling rate thermal component sequence th(n) is provided as a subtraction input to a summation block 126. Also provided to the summation block 126 is the digital readback signal, after having been delayed by a number of samples M which corresponds to a timing window length used in block 120 to obtain the estimated thermal component of the digital readback signal (as described below). Thus the output of summation block 126 is a sequence y(n) which represents a "restored" readback sequence from which the thermal modulation of the digital readback signal has been removed. It will be seen from FIG. 2 that the resulting restored readback sequence y(n) is given by the following equation:

$$y(n)=x(n-M)-th(m)*q(n) \quad (1)$$

The restored digital readback sequence y(n) is then supplied to a recording channel 128 for equalization and decoding. The resulting decoded data is outputted on a line 130 and passed on to the host system, which is not shown. The processes of blocks 118, 120, 122, 124 and 126 may be performed, in whole or in part, by a digital signal processor or other suitable processing circuitry (not shown).

Operation of block 120 will now be described with reference to FIGS. 3 and 4.

Figure 3:
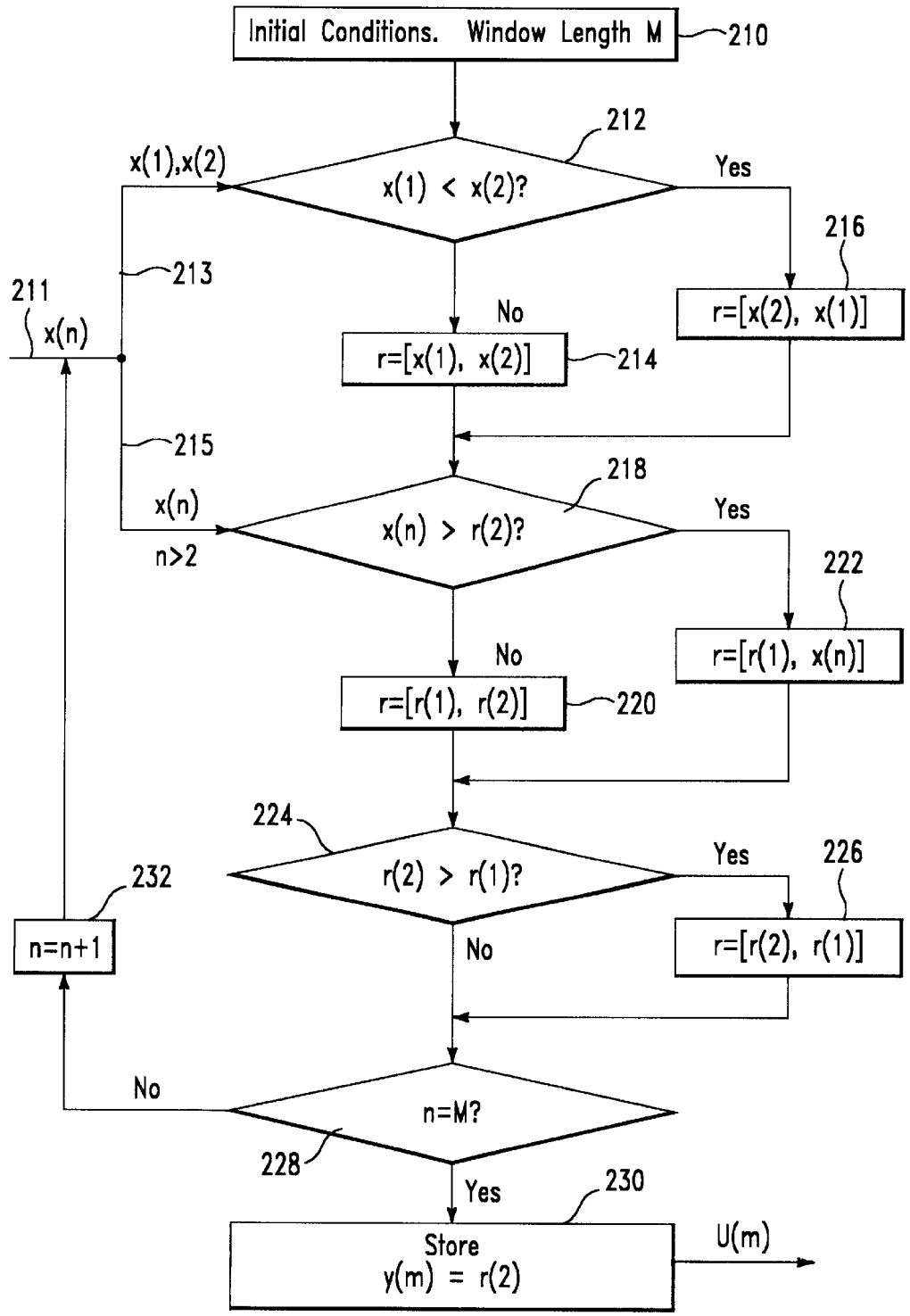
FIG. 3 is a flow chart that illustrates a procedure carried out by the circuitry of FIG. 2 to obtain an upper envelope sequence for a digital readback signal generated in the hard disk drive of FIG. 2.

Referring initially to FIG. 3, there will first be described extraction of an upper envelope sequence for the digital readback signal.

Initially, at block 210 a timing window of M samples is set. According to a preferred embodiment of the invention, M is at least as large as the quotient $F_s/F_{(low)}$, where $F_s$ is the sampling rate used in block 114 (FIG. 2) to obtain the digital readback signal and $F_{(low)}$ is a lowest frequency modulation frequency of the digital readback signal. For example, if the sampling rate $F_s$ is 250 MHz and $F_{(low)}$ is 10 MHz, then the minimum window length becomes M=25 samples.

Continuing to refer to FIG. 3, the digital readback sequence x(n) is provided as an input on line 211. The first two samples x(1) and x(2) of the window of M samples are extracted on line 213 and provided to decision block 212. It is determined at decision block 212 whether the first sample x(1) is less than the second sample x(2). If so, a two-element vector r is organized as r=[x(2),x(1)] at block 216. However, if a negative determination is made at block 212, then the two element vector r is set as [x(1),x(2)] in block 214. The next input sample of x(n) in the window, namely x(3) in the first instance, is obtained as an input on line 215 and is compared with the second element of vector r at decision block 218 (e.g., either x(1) or x(2) in this example, depending on whether the vector r was organized in block 214 or block 216). If the next input sample of x(n) is found to be greater than the second element r(2) of vector r, then block 222 follows. At block 222, vector r is reorganized as [r(1), x(n)]. If it is found at block 218 that the input sample x(n) is not greater than r(2) then vector r remains unchanged (block 220) as [r(1),r(2)]. Following either block 220 or 222, as the case may be, is a decision block 224 in which it is determined whether the second element r(2) of the vector r is greater than the first element r(1) of the vector r. If so, the order of the two elements is reversed in block 226. If not, the order of the two elements of the vector r remains unchanged. Following block 226 if a positive determination is made at decision block 224, or directly following decision block 224 if a negative determination is made thereat, is decision block 228. At decision block 228 it is determined whether the current input sample x(n) is the last sample of the timing window; i.e. it is determined if n=M. If not, the index n is incremented at block 232, and the process of FIG. 3 loops back to provide the next sample on line 215 to decision block 218.

However, if it is determined at block 228 that the current sample of x(n) is the last sample of the window, then the second element r(2) of the vector r is stored (block 230) as an indication of the upper envelope of the digital readback signal x(n). It will be recognized that the algorithm of FIG. 3 has operated so that, after all of the input samples for the window have been considered, the second element r(2) of the vector r is the second largest sample within the window. While the next window of samples is being considered, the stored second largest value from the previous window is outputted as u(m) as an element of an upper envelope sequence.

Figure 4:
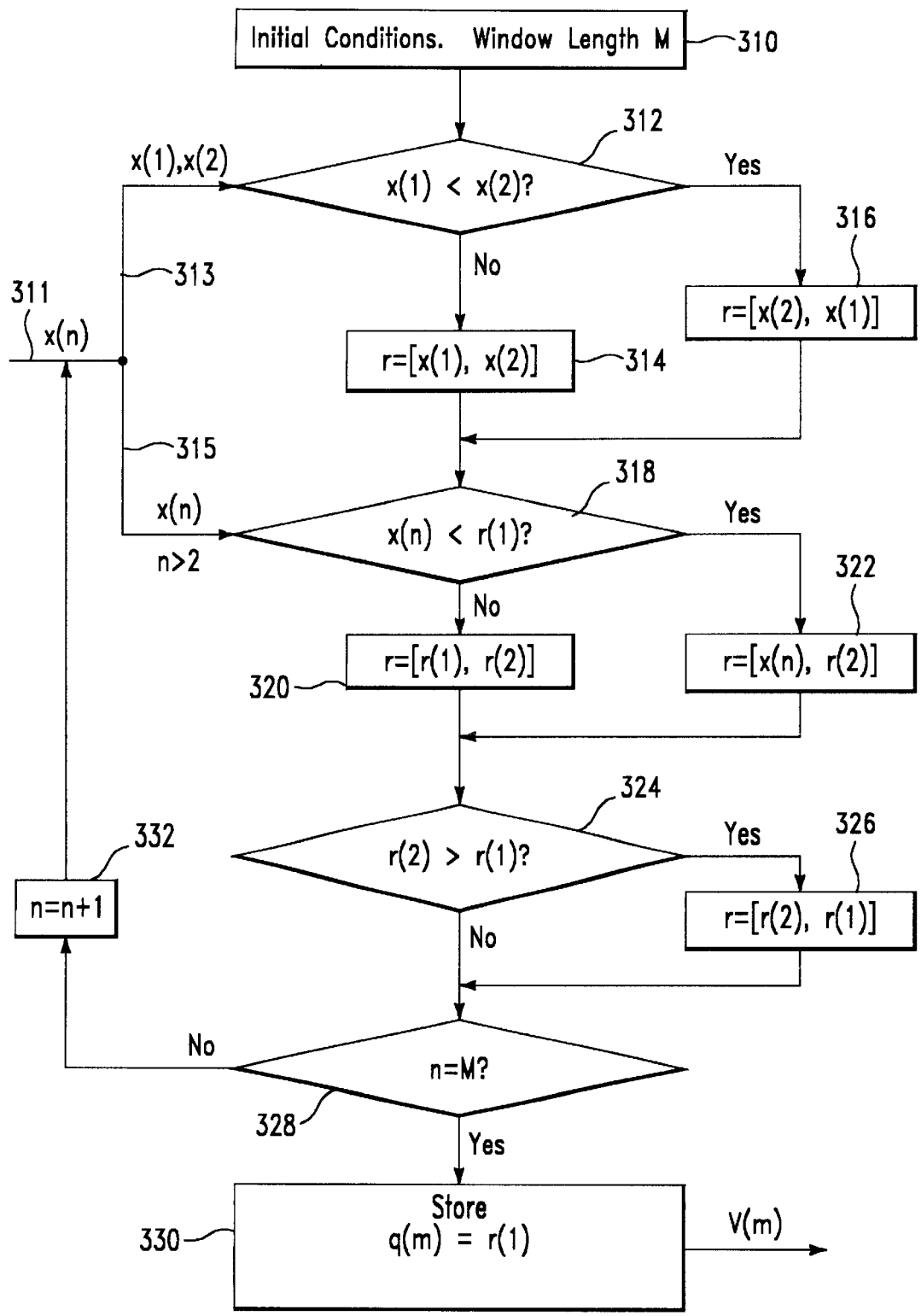
FIG. 4 is a flow chart that illustrates a procedure carried out by the circuitry of FIG. 2 to obtain a lower envelope sequence for the digital readback signal generated by the hard disk drive of FIG. 2.

The algorithm of FIG. 4 operates in similar fashion to find the second smallest sample in the current window. Thus, initial conditions, including setting of the window length M, are set in block 310. The input sample train x(n) of the digital readback signal is received on line 311 and the first two samples of the window, x(1) and x(2), are extracted on line 313 and compared to each other at decision block 312. If x(1) is less then x(2), then the vector r is initially established as [x(2),x(1)] (block 316). Otherwise, at block 314, the vector r is established as [x(1),x(2)]. Then decision block 318 follows, receiving as an input the next sample of the digital readback signal on line 315 (e.g., x(3)). This next sample is compared with r(1), the first element of the vector r. If the current sample is less than r(1), then the current sample replaces r(1) in vector r (block 322). Otherwise vector r remains unchanged (block 320). Block 324 then follows block 320 or block 322 as the case may be. At block 324 it is determined whether the second element of the vector r is greater than the first element of the vector r. If so, the positions of the two elements are reversed (block 326). Otherwise, the vector r remains unchanged. Block 328 follows, at which it is determined whether the current input sample is the last sample within the timing window (e.g., if n=M). If not, the index n is incremented (block 332) and the next sample of the window is inputted on line 315 to decision block 318. However, if it is determined at block 328 that the current sample is the last sample in the window, then the first element of the vector r is stored as an indication of the lower envelope of the digital readback signal (block 330). It will be recognized that the stored first element of vector r is the second lowest sample within the timing window. While processing of the next window of samples proceeds, this value is outputted as v(m) as an element of the lower envelope sequence.

Block 120 (FIG. 2) derives the estimated thermal component sequence th(m) as the arithmetic mean of the sequences u(m) and v(m) as indicated in the following equation:

$$th(m)=[u(m)+v(m)]/2 \qquad (2)$$

As noted before, the resulting estimated thermal component, after being converted to a high-rate sample train th(n) via modulation by the impulse train q(n) generated by the impulse generator 122, is subtracted from the delayed digital readback signal x(n−M) to generate a restored digital readback signal y(n).

Figure 1A:
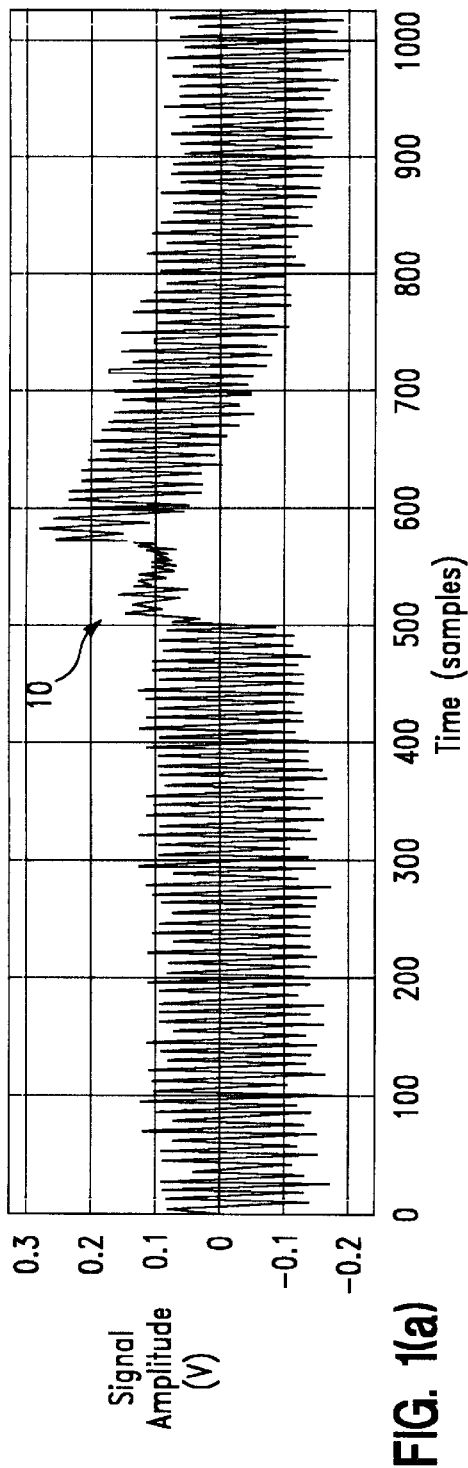
FIG. 1(a) is a graphical representation of a readback signal voltage produced by an MR head of a hard disk drive and modulated by a thermal asperity.
Figure 1B:
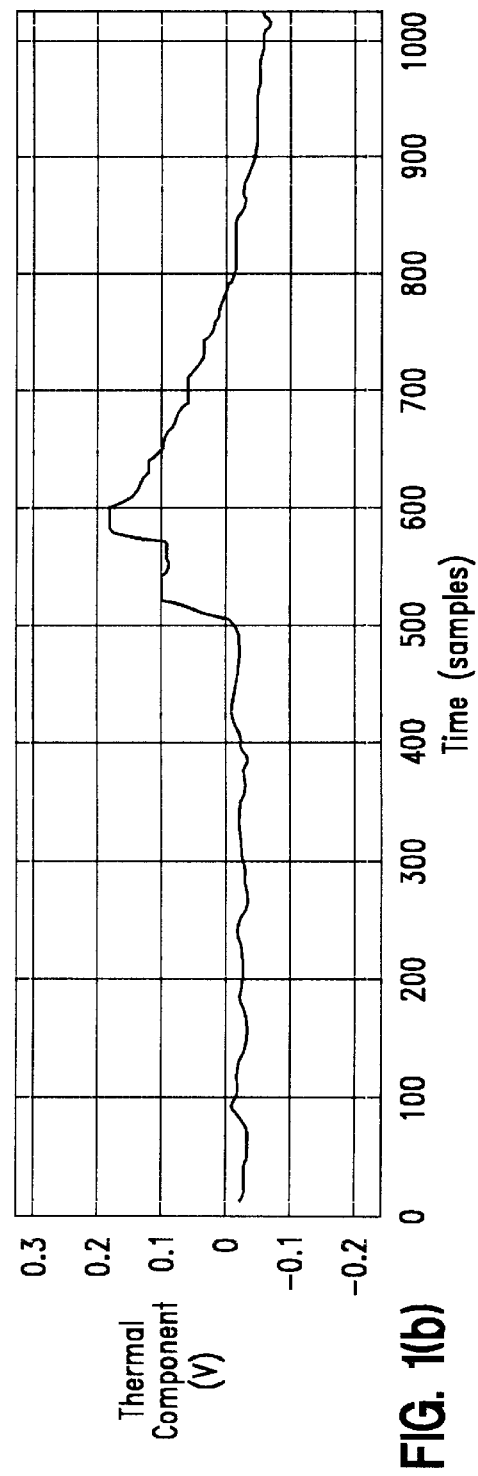
FIG. 1(b) is a graphical representation of the thermal component of the signal voltage shown in FIG. 1(a)
Figure 5A:
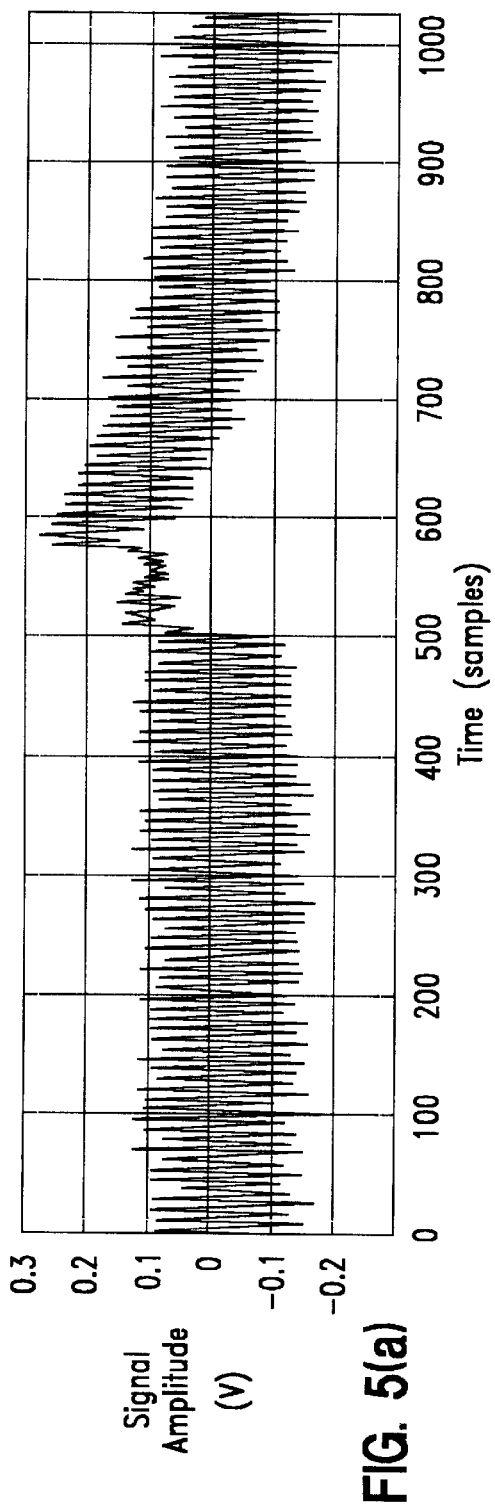
FIG. 5(a) is a graphical representation of a readback signal voltage produced by the hard disk drive of FIG. 2 and modulated by a thermal asperity.
Figure 5B:
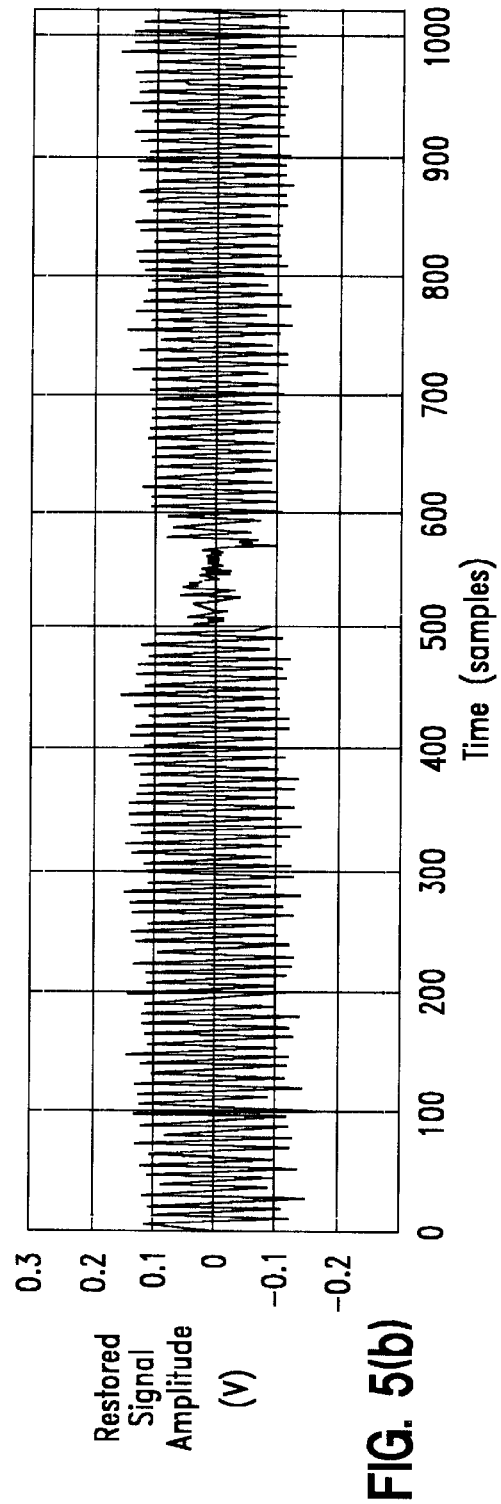
FIG. 5(b) shows the readback signal voltage of FIG. 5(a) after thermal modulation has been removed therefrom by the circuitry of FIG. 2.

FIG. 5(*a*) is reminiscent of FIG. 1(*a*) and graphically in presents the digital readback signal x(n) modulated by a thermal asperity. FIG. 5(*b*) shows the corresponding restored digital readback signal y(n) produced by the circuit of FIG. 2. It will be observed that the thermal modulation has been removed from the digital readback signal and the baseline has been restored, so that the restored readback sequence y(n) can be processed without soft or hard data errors by the recording channel 128 (FIG. 2).

Figure 6A:
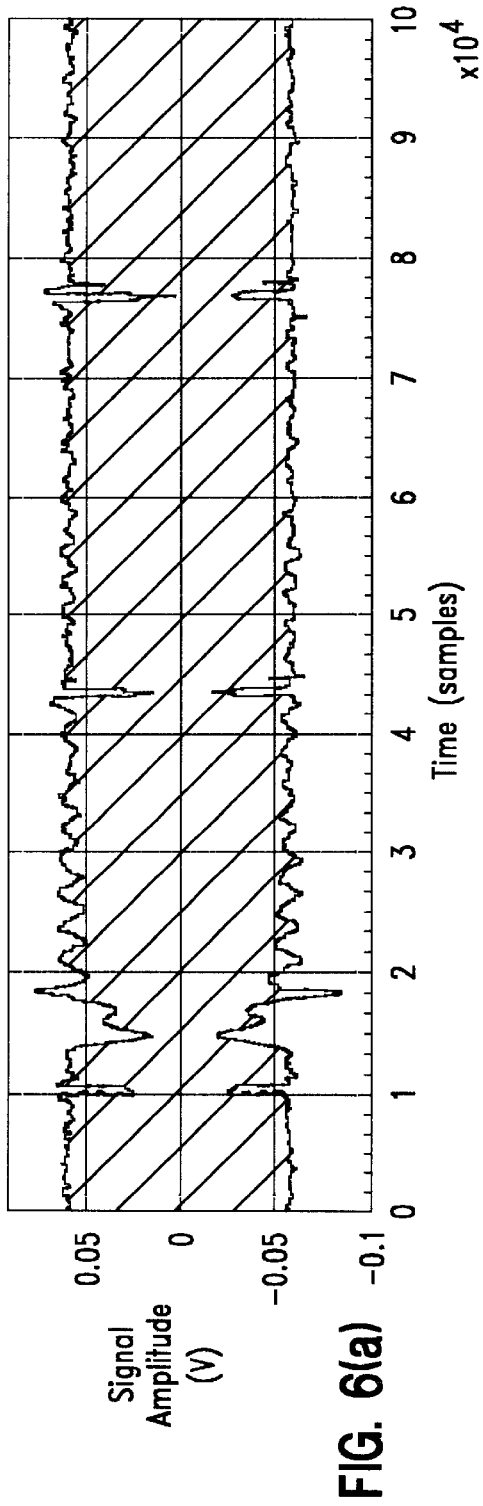
FIG. 6(a) is a graphical representation of a readback signal voltage produced by the hard disk drive of FIG. 2 and modulated by a thermal reaction to a bump on the surface of the data storage disk.
Figure 6B:
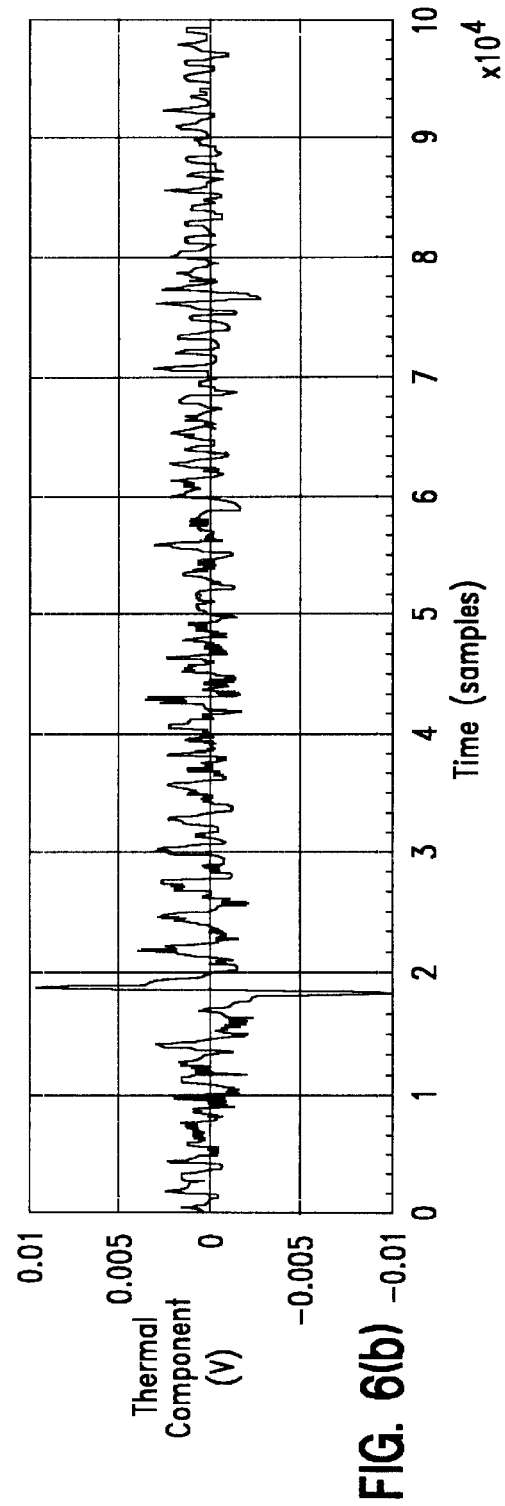
FIG. 6(b) is a graphical representation of the thermal voltage component of the signal of FIG. 6(a)

FIG. 6(*a*) shows the readback signal x(n) disturbed by a bump on the data storage disk 110, but without contact between the MR head 112 and data storage disk 110. The thermal component of the signal shown in FIG. 6(*a*) is graphically illustrated in FIG. 6(*b*). It will be noted that the magnitude of the thermal component is only on the order of about 5% of the thermal component of the thermal asperity of FIGS. 5(*a*) and 1(*a*).

Figure 7A:
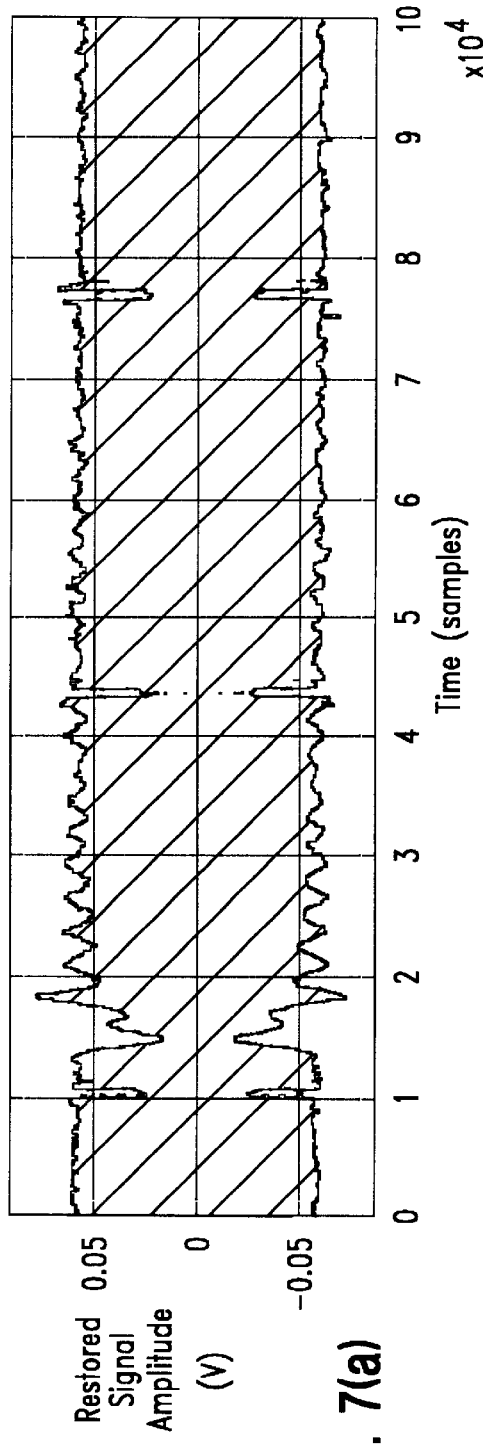
FIG. 7(a) is a graphical representation of the signal of FIG. 6(a) with the thermal voltage component removed therefrom.
Figure 7B:
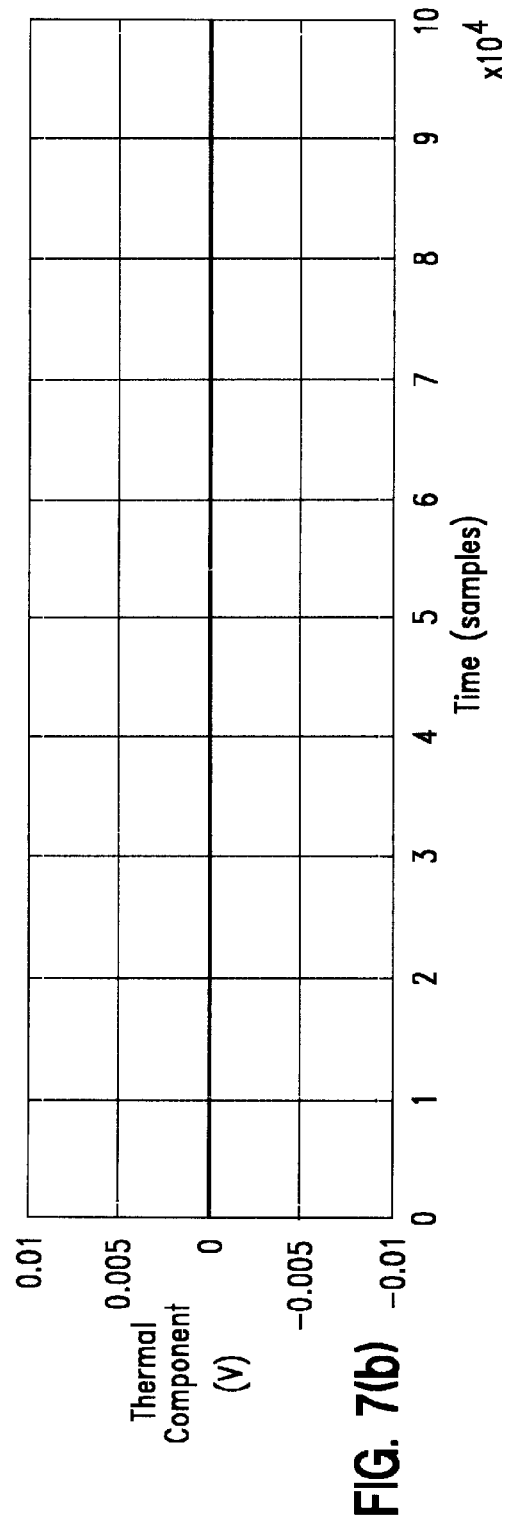
FIG. 7(b) is a graphical representation of the zeroed-out thermal voltage component of the signal of FIG. 7(a).

FIG. 7(*a*) shows the restored readback signal y(n) produced by the circuitry of FIG. 2, and FIG. 7(*b*) indicates the zeroed-out thermal component of the restored readback signal.

The present invention operates effectively to remove thermal modulation from a readback signal provided by an MR head of a hard disk drive. Even in the presence of variable frequencies which are characteristic of user-recorded data on a hard disk drive, the technique of the present invention is robust because it is non-linear. It will be appreciated that the present invention can be implemented in software (microcode) and therefore can be easily incorporated in, or provided as a retrofit for, hard disk drives. The effective readback signal restoration provided by the present invention is likely to be of particular importance as hard disk drive recording density continues to increase, with corresponding reductions in transducer fly height and greater susceptibility to thermal modulation.

The present invention uses the second largest and second smallest samples in each window as indicators, respectively, of upper and lower envelopes of the readback signal to reduce the possibility that outliers due to noise may distort the estimated thermal component of the readback signal. As alternatives, however, the third highest and lowest, or fourth highest and lowest, etc. samples in each window may be used as indicators of the upper and lower envelopes of the readback signal. As another alternative, it is contemplated in a relatively low-noise environment to use the maximum and minimum samples in each window as indicators of the upper envelope and the lower envelope of the readback signal.

Those who are skilled in the art will also note that the algorithms respectively illustrated in FIGS. 3 and 4 are similar to each other and accordingly could be combined into a single algorithm to produce both the upper envelope sequence u(m) and the lower envelope sequence v(m). This method is much more efficient and faster than a median filter which must rank or sort all of the samples within the timing window before the median value can be determined. This is an important feature of the invention which may operate in real time at a very high speed and requires very low computational burden.

The foregoing description discloses only the preferred embodiments of the invention; modifications of the above disclosed apparatus and method which fall within the scope of the invention will be readily apparent to those of ordinary skill in the art. Accordingly, while the present invention has been disclosed in connection with the preferred embodiments thereof, it should be understood that other embodiments may fall within the spirit and scope of the invention, as defined by the following claims.

The invention claimed is:

1. A method for processing a signal obtained from a storage medium using a magnetoresistive (MR) element, the method comprising the steps of:
   reading the signal from the storage medium using the MR element;
   sampling and digitizing the signal to obtain a digital readback signal;
   estimating an envelope of the digital readback signal by applying a digital process to the digital readback signal to obtain an upper envelope sequence and a lower envelope sequence;
   deriving an estimated thermal component of the digital readback signal from the upper envelope sequence and the lower envelope sequence; and
   subtracting the estimated thermal component from the digital readback signal to generate a restored digital readback signal.

2. The method of claim 1, wherein the estimating step includes examining the digital readback signal in a sequence of timing windows.

3. The method of claim 2, wherein the timing windows are non-overlapping.

4. The method of claim 2, wherein for each of the windows:
   a second highest value of the digital readback signal in the respective window is found to indicate the upper envelope sequence; and
   a second lowest value of the digital readback signal in the respective window is found to indicate the lower envelope sequence.

5. The method of claim 2, wherein each window has a length M that is not less than a quotient $F_s \div F_{(low)}$, where $F_s$=a sampling rate used at the sampling and digitizing step, and $F_{(low)}$=a lowest frequency modulation frequency of the digital readback signal.

6. The method of claim 1, wherein the deriving step includes obtaining an arithmetic mean of the upper and lower envelope sequences.

7. The method of claim 1, wherein the readback signal is a voltage signal.

8. The method of claim 1, wherein the readback signal is a current signal.

9. A signal processing apparatus for an information storage device including an information storage medium, comprising:
   a transducer, including a magnetoresistive element, for reading a signal from the storage medium;
   a high pass filter coupled to the transducer;
   an amplifier coupled to the high pass filter;
   an analog-to-digital converter, coupled to the amplifier, for digitizing the signal read by the transducer to obtain a digital readback signal; and
   a digital signal processing circuit, coupled to the analog-to-digital converter, for estimating an envelope of the digital readback signal by applying a digital process to the digital readback signal to obtain an upper envelope sequence and a lower envelope sequence, deriving an estimated thermal component of the digital readback signal from the upper envelope sequence and the lower envelope sequence, and subtracting the estimated thermal component from the digital readback signal to generate a restored digital readback signal.

10. The apparatus of claim 9, wherein the estimating of the envelope of the digital readback signal includes examining the digital readback signal in a sequence of timing windows.

11. The apparatus of claim 10, wherein the windows are non-overlapping.

12. The apparatus of claim 10, wherein for each of the timing windows:
   a second highest value of the digital readback signal in the respective window is found to indicate the upper envelope sequence; and
   a second lowest value of the digital readback signal in the respective window is found to indicate the lower envelope sequence.

13. The apparatus of claim 10, wherein each window has a length M that is not less than a quotient $F_s \div F_{(low)}$, where $F_s$=a sampling rate used at the sampling and digitizing step, and $F_{(low)}$=a lowest frequency modulation frequency of the digital readback signal.

14. The apparatus of claim 9, wherein the deriving of the estimated thermal component of the digital readback signal includes obtaining an arithmetic mean of the upper and lower envelope sequences.

15. An information storage device, comprising:
   a storage medium;
   a transducer, including a magnetoresistive element, for reading a signal from the storage medium;
   an apparatus for moving at least one of the transducer and the medium to provide a relative movement between the transducer and the medium;
   a high pass filter coupled to the transducer;
   an amplifier coupled to the high pass filter;
   an analog-to-digital converter, coupled to the amplifier, for sampling and digitizing the signal read by the transducer to obtain a digital readback signal; and
   a digital signal processing circuit, coupled to the analog-to-digital converter, for estimating an envelope of the digital readback signal by applying a digital process to the digital readback signal to obtain an upper envelope sequence and a lower envelope sequence, deriving an estimated thermal component of the digital readback signal from the upper envelope sequence and the lower envelope sequence, and subtracting the estimated thermal component from the digital readback signal to generate a restored digital readback signal.

16. A computer program product comprising:
   a medium readable by a computer, the computer readable medium having computer program code adapted to:
   estimate an envelope of a digital readback signal obtained by sampling and digitizing a signal read from a magnetic disk by a magnetoresistive element, and by applying a digital process to the digital readback signal to obtain an upper envelope sequence and a lower envelope sequence;
   derive an estimated thermal component of the digital readback signal from the upper envelope sequence and the lower envelope sequence; and
   subtract the estimated thermal component from the digital readback signal to generate a restored digital readback signal.

17. A signal processing apparatus for an information storage device including an information storage medium, comprising:
   a transducer, including a magnetoresistive element, adapted to read a signal from the storage medium;

an analog-to-digital converter adapted to digitize the signal read by the transducer to obtain a digital readback signal; and a digital signal processing circuit adapted to:

estimate an envelope of the digital readback signal by applying a digital process to the digital readback signal to obtain an upper envelope sequence and a lower envelope sequence;

derive an estimated thermal component of the digital readback signal from the upper envelope sequence and the lower envelope sequence; and subtract the estimated thermal component from the digital readback signal to generate a restored digital readback signal.

* * * * *